US009458630B2

(12) United States Patent
Ji

(10) Patent No.: US 9,458,630 B2
(45) Date of Patent: Oct. 4, 2016

(54) METHOD FOR PRODUCING MICROCELLULAR FOAM POLYPROPYLENE THICK BOARD

(71) Applicant: MICROCELL TECHNOLOGY CO., LTD, Yangzhou, Jiangsu (CN)

(72) Inventor: Zhengrong Ji, Yangzhou (CN)

(73) Assignee: MICROCELL TECHNOLOGY CO., LTD., Yangzhou, Jiangsu (CN)

( * ) Notice: Subject to any disclaimer, the term of this patent is extended or adjusted under 35 U.S.C. 154(b) by 446 days.

(21) Appl. No.: 14/125,534

(22) PCT Filed: Nov. 13, 2012

(86) PCT No.: PCT/CN2012/084503
§ 371 (c)(1),
(2) Date: Dec. 11, 2013

(87) PCT Pub. No.: WO2014/071641
PCT Pub. Date: May 15, 2014

(65) Prior Publication Data
US 2014/0225295 A1    Aug. 14, 2014

(30) Foreign Application Priority Data
Nov. 8, 2012   (CN) .......................... 2012 1 0443118

(51) Int. Cl.
*E04C 2/30* (2006.01)
*B29C 44/04* (2006.01)
(Continued)

(52) U.S. Cl.
CPC ................ *E04C 2/30* (2013.01); *B29C 44/04* (2013.01); *B29C 44/348* (2013.01);
(Continued)

(58) Field of Classification Search
CPC . E04C 2/205; B29C 44/206; B29C 44/3453; B29C 44/3461; B29C 44/348; B29C 44/381; B29C 44/3442; B29C 44/00; B29C 67/20; B29C 47/0059
See application file for complete search history.

(56) References Cited

U.S. PATENT DOCUMENTS

2010/0215934 A1*   8/2010   Fabian Mariezkurrena et al. .................. B29C 44/3446
428/220

FOREIGN PATENT DOCUMENTS

| CN | 101343927 A | 1/2009 |
| CN | 101654946 A | 2/2010 |

(Continued)

OTHER PUBLICATIONS

Li, Zude, "Handbook of Plastic Process", Oct. 1997, pp. 396-397, ISBN 7-5047-1300-7/TB 0030.
(Continued)

*Primary Examiner* — Stella Yi
(74) *Attorney, Agent, or Firm* — Locke Lord LLP; Tim Tingkang Xia, Esq.

(57) ABSTRACT

Disclosed is a method for producing a microcellular foam polypropylene thick board, by foaming a polypropylene motherboard by a flat foaming equipment, wherein the polypropylene motherboard bears a core structure and a pore canal structure in the core of the foam polypropylene motherboard, shortening a diffusion path of supercritical carbon dioxide into a polypropylene matrix, thus reducing the saturation time required for diffusion equilibrium and significantly increasing the production efficiency. Also provided is a method for preparing the foam polypropylene motherboard bearing the pore canal structure in the core, by extrusion molding, from general polypropylene as the raw material. The method described in the present invention may be used to produce the microcellular foam board with small cell size, high cell density and high thickness.

8 Claims, 2 Drawing Sheets

(51) Int. Cl.
   *B29C 44/34*    (2006.01)
   *C08J 9/12*     (2006.01)
   *B29L 7/00*     (2006.01)
   *B29K 23/00*    (2006.01)
   *B29K 105/04*   (2006.01)

(52) U.S. Cl.
   CPC .......... *B29C 44/3453* (2013.01); *C08J 9/122*
       (2013.01); *B29K 2023/12* (2013.01); *B29K*
       *2105/041* (2013.01); *B29L 2007/002*
       (2013.01); *C08J 2201/03* (2013.01); *C08J*
       *2201/032* (2013.01); *C08J 2203/06* (2013.01);
       *C08J 2203/08* (2013.01); *C08J 2205/044*
       (2013.01); *C08J 2323/10* (2013.01)

(56) References Cited

FOREIGN PATENT DOCUMENTS

| | | | |
|---|---|---|---|
| CN | 101722640 A | | 6/2010 |
| CN | 101948585 A | | 1/2011 |
| CN | 102167840 | * | 8/2011 |
| CN | 102167840 A | | 8/2011 |
| CN | 202225413 U | | 5/2012 |
| WO | 2008148918 A1 | | 12/2008 |

OTHER PUBLICATIONS

State Intellectual Property Office of P. R. China (ISR/CN), "International Search Report", for International application No. PCT/CN2012/084503, issued on Aug. 8, 2013, China.

* cited by examiner

METHOD FOR PRODUCING MICROCELLULAR FOAM POLYPROPYLENE THICK BOARD

BACKGROUND OF THE INVENTION

1. Field of Invention

The present invention relates to the field of preparation of high molecular foam materials, and in particular to a method for producing a microcellular foam polypropylene thick board.

2. Related Art

A microcellular foam polymeric material refers to a porous foam polymeric material with cell size of less than 100 μm and cell density of greater than $1.0 \times 10^6 / cm^3$. Due to its light weight, high strength, and material saving properties etc., the microcellular foam materials have widespread prospects in application. Among a multitude of the microcellular foam polymeric materials, the microcellular foam polypropylene (PP) materials have favorable mechanical properties, higher heat-deformation temperature, chemical resistance, surface protection performance and easy recycle and reuse. For the microcellular foam polypropylene materials obtained by foaming with supercritical carbon dioxide or supercritical nitrogen gas, it is clean, and pollution-free. In particular, the microcellular foam polypropylene board with high thickness in articles, for example, a thickness of more than 10 mm, which is the desirable core material for a sandwiching composite, may be used as a thermal barrier in a thermally insulated car and a refrigerator car, a ceiling board and floor in an automobile, a passenger car and a railway transportation vehicle, etc., and may be used for thermal insulation of ships and buildings etc.

It is difficult for the common continuous extrusion foaming method to make the microcellular foam polypropylene thick board. With limitation by the dispersion level of the raw material resin and gas in the molten mass, the depressurization rate at the die head, the removal of heat at the core of foam, and the like, the continuous extrusion foaming is only suitable for production of the microcellular foam board with relatively lower thickness of generally less than 5 mm.

The solid foaming method is commonly used for preparation of the microcellular foam polymeric material. The solid foaming process is one in which at the condition of the polymer still being in the form of solid with the foaming temperature being lower than the flowing temperature, the high pressure gas is dissolved and diffused into the polymeric matrix prior to induction of cell nucleation and growth by flash blow-down. In general, during solid foaming, the foaming temperature is higher than the glass transition temperature for the amorphous polymers, and is lower than the melting point for the semi-crystal polymers.

The solid foaming process is characterized in that: (1) a low requirement for foamability of the raw material resin, which is different from the foaming processes such as extrusion, injection molding and the like. For providing the foam material with closed cell structure, the material is usually required to have higher strength of molten mass for fusion foaming, to avoid cell fracture phenomena at the time of cell growth. For solid foaming process, as a result of the polymer itself being in the form of solid, the polymer has its own sufficient strength to allow the tensile effect on the polymer during cell growth and maintain the closed cell structure of cells. Therefore, the general polymers are available for foaming, without the foaming raw materials with high molten mass strength obtained from special modification. (2) during solid foaming, the gas passes by self-diffusion into the polymeric matrix for dispersion at the molecular level, in favor of uniform nucleation of cells, thus facilitating formation of the microcellular foaming material with small cell size and high cell density. (3) Temperature uniformity within the polymer at pressurized atmosphere and readily available flash blow-down tend to provide the microcellular foaming material with small cell size, high cell density and uniform cell size.

During solid foaming, the high pressure gas permeates by self-diffusion in the polymeric matrix, and the saturation time for diffusion equilibrium depends on the foaming temperature, the gas pressure, the type of polymer resins and its thickness. For most of polymers, the gas usually diffuses therein at a slower rate, and the saturation time required for dissolution equilibrium is long. Especially with increase of the articles in thickness, the saturation time would extend significantly. Therefore, the solid foaming method is often used for preparation of the board with lower thickness, but it is time-consuming and inefficient for preparation of the microcellular foam board with higher thickness.

SUMMARY OF THE INVENTION

For the problems in the prior art, the present invention aims to provide a method for producing a microcellular foam polypropylene thick board, which may be used for producing the microcellular foam board with small cell size, high cell density and high thickness.

For solving the problems in the prior art, the present invention adopts the technical solution: a method for producing a microcellular foam polypropylene thick board by foaming a polypropylene motherboard with a flat foaming equipment, characterized in that the polypropylene motherboard bears a core structure.

The polypropylene motherboard bearing the core structure is an extruded polypropylene board with one or more rows of pore canals in the center.

The extruded polypropylene board has a thickness of 5-50 mm, and preferably of 10-30 mm.

The pore canals have a cross-section in the shape of a polygon with the number of sides of 3-8, a circle or an ellipse.

The pore canals have a height of 0.1-10 mm, and preferably of 0.5-5 mm.

The pore canals have a width of 0.1-50 mm, and preferably of 0.5-5 mm.

There is a pitch of 0.1-20 mm and preferably of 1-3 mm between adjacent pore canals.

The method for foaming a polypropylene motherboard bearing the core structure with the flat foaming equipment involves foaming with the special supercritical flat foaming equipment.

The supercritical flat foaming equipment includes: a hydraulic system for supplying clamping pressure, a temperature control system for supplying heat, a pressure gas delivery system for supplying supercritical fluid, a flat foaming mold, a flash blow-down system and a gas recovery system.

The specific foaming process includes the following steps:

(1) The flat foaming mold is heated up to the foaming temperature by the temperature control system for supplying heat;

(2) the polypropylene motherboard bearing the core structure is placed into the flat foaming mold, which is driven by the hydraulic system for closure; upon pressurizing up to 15-20 MPa by the hydraulic system, the high pressure and high temperature gas is introduced into the flat foaming mold by the pressure gas delivery system until the gas pressure is up to 5-25 MPa and preferably to 10-15 MPa;

(3) The high pressure and high temperature gas is diffused from the surface and core of the polypropylene motherboard into the polymeric matrix simultaneously, with the saturation time required for diffusion being 30-200 minutes and preferably 40-100 minutes; and (4) Upon dissolution in equilibrium, the gas within the flat foaming mold is blown down by the flash blow-down system and is recovered by the gas recovery system; when the mold is opened, the polypropylene motherboard pops out of the mold and foams to give the microcellular foam polypropylene material.

The foaming temperature is lower than the polypropylene melting point, and is preferably 130-160° C.;

The high pressure and high temperature gas is carbon dioxide or nitrogen gas, or a mixture of the both at an arbitrary ratio.

The flat foaming mold has a sealing material, which is a composite of any one or more of beryllium copper, aluminum, graphite or polytetrafluoroethylene.

A method for producing the polypropylene motherboard bearing the core structure by an extrusion molding production line including a blender, a crew extruder, a special flat extrusion die, a cooling and shaping table, a spraying tank, a hauler and a cutter; and specific preparation is as follows:

(1) The raw material polypropylene is drawn into a hopper of the crew extruder and dried at 70-80° C.;

(2) The dried raw material is plasticized and mixed in the crew extruder with the parameters set as: the screw temperature of 160-250° C., the die head temperature of 160-180° C., the molten mass pressure of 5-15 MPa, and the host rotation rate of 10-50 rpm;

(3) The plasticized polypropylene molten mass is molded by the special flat extrusion die, to form the polypropylene extrusion board at fusion state having pore space in the core;

(4) The polypropylene extrusion board at fusion state having pore space in the core is passed through the cooling and shaping table by pulling force from the hauler, to provide preliminary cooling and shaping, with a pulling rate of the hauler being 10-50 cm/min, and a temperature of the cooling and shaping table being 5-20° C.;

(5) After exiting the cooling and shaping table, the preliminarily shaped polypropylene extrusion board is passed into the spraying tank for further cooling at the temperature of spray water of 10-30° C.; and (6) The sprayed polypropylene extrusion board is cut at a certain length by the cutter, to obtain the polypropylene motherboard.

The raw material polypropylene is polypropylene of general grade, and in particular, homo-polymerized polypropylene or randomly copolymerized polypropylene.

The raw material polypropylene has a melt index of 0.1-5.0 g/10 min, and preferably of 0.1-3.0 g/10 min.

After adding aids and premixing in the blender, the raw material polypropylene mentioned in Step (1) is drawn again into the hopper of the crew extruder and dried at 70-80° C., where the aids include a color masterbatch, an inorganic filler, a fire retardant, an anti-static agent; and on a basis of 100 parts by weight of the raw material polypropylene, the color masterbatch is 0-2 parts by weight, the inorganic filler is 0-10 parts by weight, the fire retardant is 0-30 parts by weight, and the anti-static agent is 0-15 parts by weight; addition of the aids and type of the aids depend on specific product requirements, where the fire retardant and anti-static agent are respectively for the purpose of achieving fire retarding and antistatic properties; in the application area having a high fire resistance requirement, the polypropylene foam material is generally required to have the fire retarding property, and at this point, the fire retardant is added; while in the application area for packaging of electronic products, the polypropylene foam material is generally required to have the antistatic property, and at this point, the anti-static agent is added.

The special flat extrusion die is one having one or more rows of core rods in the center, which are used to provide a pore canal structure in the center of the polypropylene extrusion board.

The core rods have the cross-section in the shape of a polygon with the number sides of 3-8, a circle or an ellipse.

The core rods have the height of 0.1-10 mm and preferably of 0.5-5 mm.

The core rods have the width of 0.1-50 mm, and preferably of 0.5-5 mm.

There is the pitch of 0.1-20 mm and preferably of 1-3 mm between adjacent core rods.

In comparison with the prior art, the present invention is advantageous in that, due to the foaming temperature being lower than the melting point of polypropylene, the gas has high solubility, cell nucleation and growth are easily controlled, and the microcellular foam polypropylene materials are easily obtained with a high expansion ratio, small cell size and high cell density; meanwhile, due to presence of pore canals in the core of the foaming motherboard, shortened diffusion path of high pressure high temperature gas in polypropylene matrix and significantly reduced saturation time tend to provide the microcellular foam polypropylene board with high thickness; meanwhile, a foaming machine may be fitted with multiple layers of flat molds, increasing the production efficiency.

DETAILED DESCRIPTION OF THE INVENTION

Figure 1:
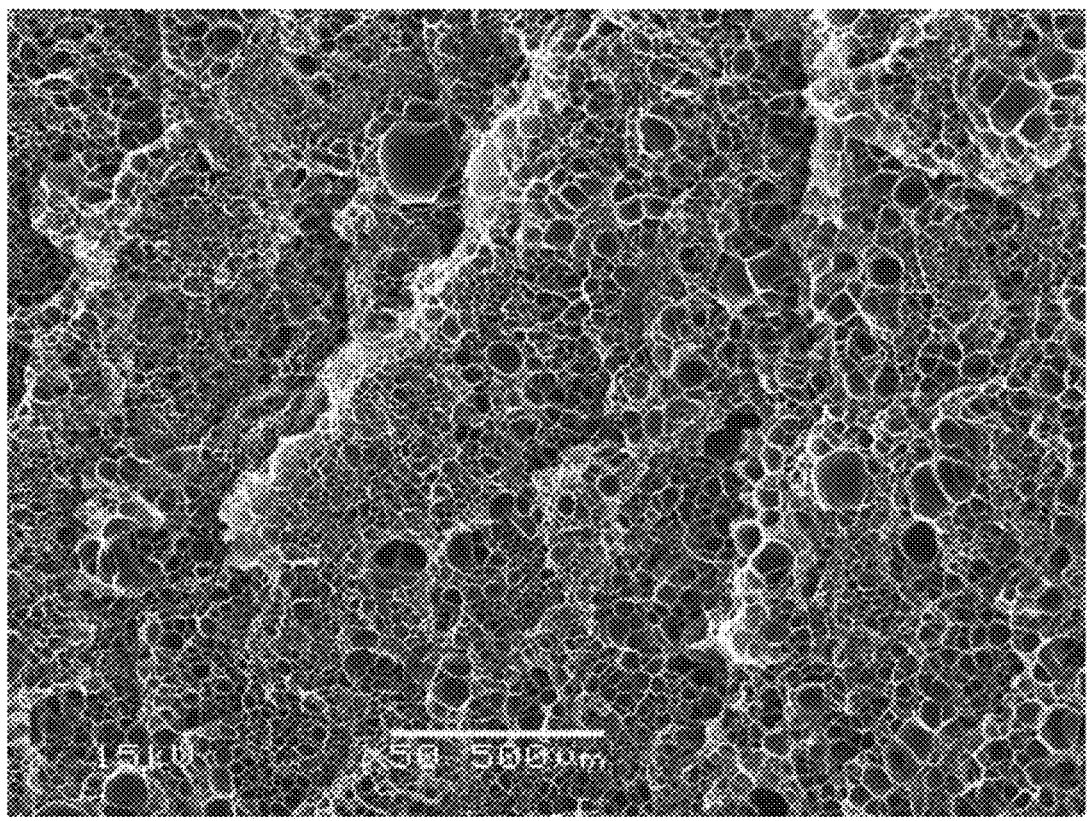
FIG. 1 is a scanning electron microgram of cell morphology within a microcellular foam sample from Embodiment 4.
Figure 2:
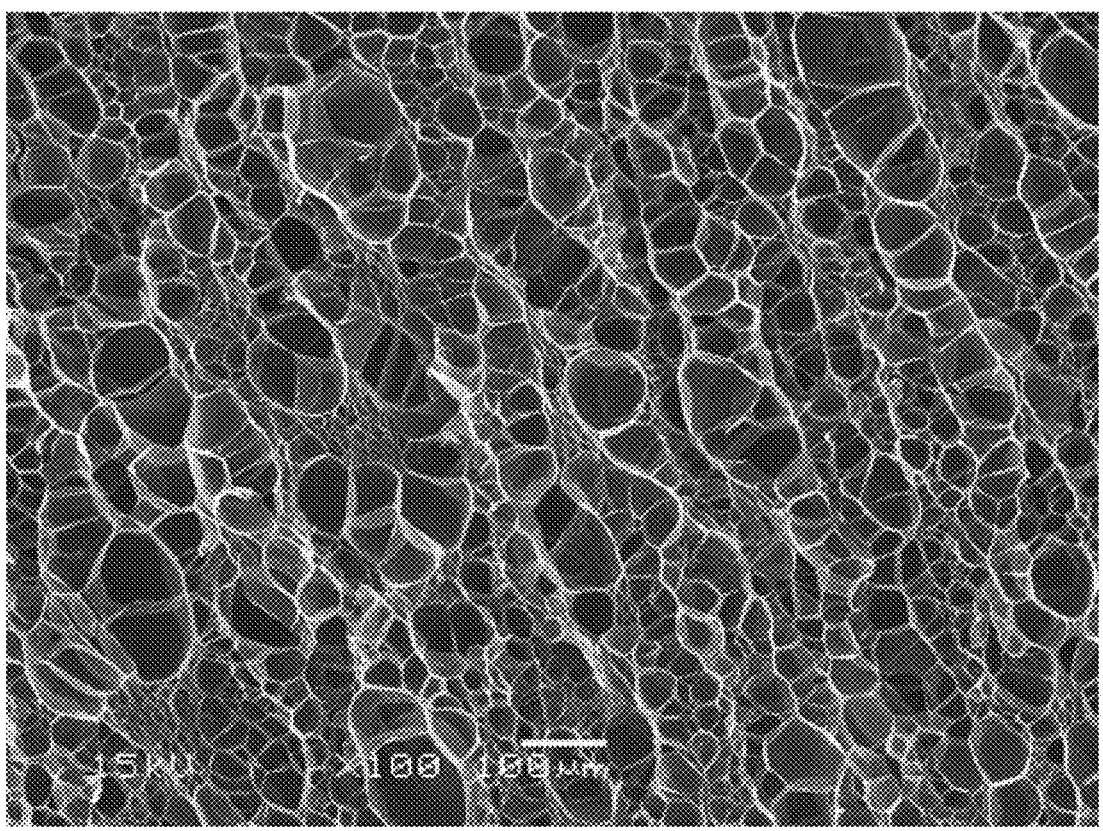
FIG. 2 is a scanning electron microgram of cell morphology within a microcellular foam sample from Embodiment 5.

It was characterized by:

From apparent density of the microcellular foam materials obtained according to ISO 845 standard testing, the expansion ratio was calculated for the final microcellular foam materials. Expansion ratio $(R_{ex}) = \rho_{polymer}/\rho_{foam}$, where $\rho_{polymer}$ was density of the un-foamed polymer, $\rho_{foam}$ was apparent density of the microcellular materials. The microcellular foam material was fractured in liquid nitrogen, the fractured section was sprayed by metal, and with the scanning electron microscope (SEM) for exploration of the cell structure within the foam material, the cell size was measured and the cell density was calculated. The cell density N $(/cm^3) = (n/A)^{3/2} \times R_{ex}$, n was the number of cells in the scanning electron photomicrograph, and A was the real area of the scanning photograph $(cm^2)$.

The tensile strength, compression strength and tearing strength were measured for the microcellular foam materials according to ISO 1798, ISO 844 and ISO 8067 respectively.

Embodiment 1

A method for producing the microcellular foam polypropylene thick board by foaming the polypropylene motherboard with the flat foaming equipment, where the polypropylene motherboard had the core structure, and particularly was the polypropylene extruded board bearing one or more rows of pore canals in the center, the specific flat foaming process includes the following steps:

(1) The flat foaming mold was heated up to the foaming temperature by the temperature control system for supplying heat, with the foaming temperature being 130° C.;

(2) The polypropylene motherboard bearing the core structure was placed into the flat foaming mold, which was driven by the hydraulic system for closure of the flat foaming mold; upon pressurizing up to 15 MPa by the hydraulic system, the high temperature carbon dioxide gas of 5 MPa was introduced into the flat foaming mold by the pressure gas delivery system;

(3) The high pressure and high temperature gas was diffused from the surface and core of the polypropylene motherboard into the polymeric matrix simultaneously, with the saturation time required for diffusion being 200 minutes; and (4) Upon dissolution in equilibrium, the gas within the flat foaming mold was blown down by the flash blow-down system and was recovered by the gas recovery system; when the mold was opened, the polypropylene motherboard pops out of the mold and foamed to give the microcellular foam polypropylene material.

Embodiment 2

A method for producing the microcellular foam polypropylene thick board by foaming the polypropylene motherboard with the flat foaming equipment, where the polypropylene motherboard had the core structure, and particularly was the polypropylene extruded board having one or more rows of pore canals in the center, the polypropylene extruded board had the thickness of 5 mm, and the cross section in the shape of circle, and the pore canals had the height of 0.1 mm, the width of 50 mm and the pitch of 0.1 mm between the pore canals; the specific flat foaming process includes the following steps:

(1) The flat foaming mold was heated up to the foaming temperature by the temperature control system for supplying heat, with the foaming temperature being 160° C.;

(2) The polypropylene motherboard bearing the core structure was placed into the flat foaming mold, which was driven by the hydraulic system for closure of the flat foaming mold; upon pressurizing up to 20 MPa by the hydraulic system, the high temperature carbon dioxide gas of 25 MPa was introduced into the flat foaming mold by the pressure gas delivery system;

(3) The high pressure and high temperature gas was diffused from the surface and core of the polypropylene motherboard into the polymeric matrix simultaneously, with the saturation time required for diffusion being 30 minutes; and (4) Upon dissolution in equilibrium, the gas within the flat foaming mold was blown down by the flash blow-down system and was recovered by the gas recovery system; when the mold was opened, the polypropylene motherboard pops out of the mold and foamed to give the microcellular foam polypropylene material.

Embodiment 3

A method for producing the microcellular foam polypropylene thick board by foaming the polypropylene motherboard with the flat foaming equipment, where the polypropylene motherboard had the core structure, and particularly was the polypropylene extruded board having one or more rows of pore canals in the center, the polypropylene extruded board had the thickness of 50 mm, and the cross section in the shape of circle, and the pore canals had the height of 10 mm, the width of 0.1 mm, and the pitch of 20 mm between the pore canals; the specific flat foaming process includes the following steps:

(1) The flat foaming mold was heated up to the foaming temperature by the temperature control system for supplying heat, with the foaming temperature being 150° C.;

(2) The polypropylene motherboard bearing the core structure was placed into the flat foaming mold, which was driven by the hydraulic system for closure of the flat foaming mold; upon pressurizing up to 20 MPa by the hydraulic system, the high temperature carbon dioxide gas of 15 MPa was introduced into the flat foaming mold by the pressure gas delivery system;

(3) The high pressure and high temperature gas was diffused from the surface and core of the polypropylene motherboard into the polymeric matrix simultaneously, with the saturation time required for diffusion being 100 minutes; and (4) Upon dissolution in equilibrium, the gas within the flat foaming mold was blown down by the flash blow-down system and was recovered by the gas recovery system; when the mold was opened, the polypropylene motherboard pops out of the mold and foamed to give the microcellular foam polypropylene material.

Embodiment 4

A method for producing the microcellular foam polypropylene thick board by foaming the polypropylene motherboard with the flat foaming equipment, where the polypropylene motherboard had the core structure, and particularly was the polypropylene extruded board having one or more rows of pore canals in the center, the polypropylene extruded board had the cross section in the shape of circle, and the pore canals had the height of 0.5 mm, the width of 50 mm and the pitch of 1 mm between the pore canals; the specific flat foaming process includes the following steps:

(1) The flat foaming mold was heated up to the foaming temperature by the temperature control system for supplying heat, with the foaming temperature being 146° C.;

(2) The polypropylene motherboard bearing the core structure was placed into the flat foaming mold, which was driven by the hydraulic system for closure of the flat foaming mold; upon pressurizing up to 20 MPa by the hydraulic system, the high temperature carbon dioxide gas of 15 MPa was introduced into the flat foaming mold by the pressure gas delivery system;

(3) The high pressure and high temperature gas was diffused from the surface and core of the polypropylene motherboard into the polymeric matrix simultaneously, with the saturation time required for diffusion being 40 minutes; and (4) Upon dissolution in equilibrium, the gas within the flat foaming mold was blown down by the flash blow-down system and was recovered by the gas recovery system; when the mold was opened, the polypropylene motherboard pops out of the mold and foamed to give the microcellular foam polypropylene material.

Embodiment 5

A method for producing the microcellular foam polypropylene thick board by foaming the polypropylene motherboard with the flat foaming equipment, where the polypropylene motherboard had the core structure, and particularly was the polypropylene extruded board having one or more rows of pore canals in the center, the polypropylene extruded board had the cross section in the shape of ellipse, and the pore canals had the height of 5 mm, the width of 0.5 mm and the pitch of 3 mm between the pore canals; the specific flat foaming process includes the following steps:

(1) The flat foaming mold was heated up to the foaming temperature by the temperature control system for supplying heat, with the foaming temperature being 158° C.;

(2) The polypropylene motherboard bearing the core structure was placed into the flat foaming mold, which was driven by the hydraulic system for closure of the flat foaming mold; upon pressurizing up to 17 MPa by the hydraulic system, the high temperature carbon dioxide gas of 25 MPa was introduced into the flat foaming mold by the pressure gas delivery system;

(3) The high pressure and high temperature gas was diffused from the surface and core of the polypropylene motherboard into the polymeric matrix simultaneously, with the saturation time required for diffusion being 60 minutes; and (4) Upon dissolution in equilibrium, the gas within the flat foaming mold was blown down by the flash blow-down system and was recovered by the gas recovery system; when the mold was opened, the polypropylene motherboard pops out of the mold and foamed to give the microcellular foam polypropylene material.

The results from testing of the foam materials from Embodiment 4 and 5 were found in table 1.

TABLE 1

| the results from testing of the foam materials from Embodiment 4 and 5 | | |
|---|---|---|
| Embodiment | 4 | 5 |
| Expansion ratio | 12 | 28 |
| Article thickness (mm) | 68 | 101 |
| Average pore size (μm) | 8.3 | 52.7 |
| Cell density (/cm$^3$) | 6.3 × 10$^9$ | 2.5 × 10$^7$ |
| Shore Hardness (HD) | 89 | 32 |
| Tensile strength (MPa) | 3.47 | 0.97 |
| Compression strength (MPa) | 1.37 | 0.21 |
| Tearing strength (kN/m) | 10.92 | 3.17 |

Embodiment 6

A method for producing the polypropylene motherboard bearing the core structure by an extrusion molding production line including a blender, a crew extruder, a special flat extrusion die, a cooling and shaping table, a spraying tank, a hauler and a cutter. The specific preparation process was as follows:

(1) The homopolymerized polypropylene with melt index of 0.1 g/10 min was premixed with the necessary aids in the blender, drawn into the hopper of the crew extruder and dried at 70° C., where for the weight ratio of the homopolymerized polypropylene to the aids, the color masterbatch was 2 parts by weight, the inorganic filler was 1 part by weight, and the anti-static agent was 15 parts by weight, on a basis of 100 parts by weight of the raw material polypropylene;

(2) The dried raw material was passed through the crew extruder for plasticizing and mixing, with the parameters of the crew extruder being set as: the screw temperature of 160° C., the die head temperature of 180° C., the molten mass pressure of 5 MPa and the host rotation rate of 10 rpm;

(3) the plasticized polypropylene molten mass was passed through the special flat extrusion die for molding, to form the polypropylene extrusion board at fusion state bearing pore space in the core, where the special flat extrusion die was one having one or more rows of core rods in the center, and the core rods were used to provide the pore canal structure in the center of the polypropylene extrusion board, and had the cross section in the shape of quadrangle, and the pore canals had the height of 0.5 mm, the width of 5 mm and the pitch of 1 mm between the pore canals;

(4) The polypropylene extrusion board at fusion state having pore space in the core was passed through the cooling and shaping table by pulling force from the hauler, to provide preliminary cooling and shaping, with a pulling rate of the hauler being 10 cm/min, and a temperature of the cooling and shaping table being 5° C.;

(5) After exiting the cooling and shaping table, the preliminarily shaped polypropylene extrusion board was passed into the spraying tank for further cooling at the temperature of spray water of 10° C.; and (6) The sprayed polypropylene extrusion board was cut at a certain length by the cutter, to obtain the polypropylene motherboard.

Embodiment 7

A method for producing the polypropylene motherboard bearing the core structure by an extrusion molding production line including a blender, a crew extruder, a special flat extrusion die, a cooling and shaping table, a spraying tank, a hauler and a cutter. The specific preparation process was as follows:

(1) The randomly copolymerized polypropylene with melt index of 5 g/10 min was premixed with the necessary aids in the blender, drawn into the hopper of the crew extruder and dried at 80° C., where for the weight ratio of the homopolymerized polypropylene to the aids, the inorganic filler was 10 parts by weight, and the fire retardant was 30 parts by weight, on a basis of 100 parts by weight of the raw material polypropylene;

(2) The dried raw material was passed through the crew extruder for plasticizing and mixing, with the parameters of the crew extruder being set as: the screw temperature of 250° C., the die head temperature of 160° C., the molten mass pressure of 15 MPa and the host rotation rate of 30 rpm;

(3) The plasticized polypropylene molten mass was passed through the special flat extrusion die for molding, to form the polypropylene extrusion board at fusion state bearing pore space in the core, where the special flat extrusion die was one having one or more rows of core rods in the center, and the core rods were used to provide the pore canal structure in the center of the polypropylene extrusion board, and had the cross section in the shape of circle, and the pore canals had the height of 5 mm, the width of 0.5 mm and the pitch of 3 mm between the pore canals;

(4) The polypropylene extrusion board at fusion state having pore space in the core was passed through the cooling and shaping table by pulling force from the hauler, to provide preliminary cooling and shaping, with a pulling rate of the hauler being 50 cm/min, and a temperature of the cooling and shaping table being 20° C.;

(5) After exiting the cooling and shaping table, the preliminarily shaped polypropylene extrusion board was passed into the spraying tank for further cooling at the temperature of spray water of 30° C.; and (6) The sprayed polypropylene extrusion board was cut at a certain length by the cutter, to obtain the polypropylene motherboard.

Embodiment 8

A method for producing the polypropylene motherboard bearing the core structure by an extrusion molding production line including a blender, a crew extruder, a special flat extrusion die, a cooling and shaping table, a spraying tank, a hauler and a cutter. The specific preparation process was as follows:

(1) The randomly copolymerized polypropylene with melt index of 1.0 g/10 min was premixed with the necessary aids in the blender, drawn into the hopper of the crew extruder and dried at 80° C., where for the weight ratio of the homopolymerized polypropylene to the aids, the inorganic filler was 10 parts by weight, and the fire retardant was 15 parts by weight, on a basis of 100 parts by weight of the raw material polypropylene;

(2) The dried raw material was passed through the crew extruder for plasticizing and mixing, with the parameters of the crew extruder being set as: the screw temperature of 250° C., the die head temperature of 160° C., the molten mass pressure of 15 MPa and the host rotation rate of 30 rpm;

(3) The plasticized polypropylene molten mass was passed through the special flat extrusion die for molding, to form the polypropylene extrusion board at fusion state bearing pore space in the core, where the special flat extrusion die was one having one or more rows of core rods in the center, and the core rods were used to provide the pore canal structure in the center of the polypropylene extrusion board, and had the cross section in the shape of circle, and the pore canals had the height of 5 mm, the width of 0.5 mm and the pitch of 3 mm between the pore canals;

(4) The polypropylene extrusion board at fusion state having pore space in the core was passed through the cooling and shaping table by pulling force from the hauler, to provide preliminary cooling and shaping, with a pulling rate of the hauler being 50 cm/min, and a temperature of the cooling and shaping table being 20° C.;

(5) After exiting the cooling and shaping table, the preliminarily shaped polypropylene extrusion board was passed into the spraying tank for further cooling at the temperature of spray water of 10° C.; and (6) The sprayed polypropylene extrusion board was cut at a certain length by the cutter, to obtain the polypropylene motherboard.

Embodiment 9

A method for producing the polypropylene motherboard bearing the core structure by an extrusion molding production line including a blender, a crew extruder, a special flat extrusion die, a cooling and shaping table, a spraying tank, a hauler and a cutter. The specific preparation process was as follows:

(1) The randomly copolymerized polypropylene with melt index of 3.0 g/10 min was premixed with the necessary aids in the blender, drawn into the hopper of the crew extruder and dried at 80° C. for 2 hours, where for the weight ratio of the homopolymerized polypropylene to the aids, the inorganic filler was 10 parts by weight, and the anti-static agent was 10 parts by weight, on a basis of 100 parts by weight of the raw material polypropylene; a screen exchanger had the temperature of 175° C.;

(2) The dried raw material was plasticized and mixed in the crew extruder with the parameters set as: processing temperature at the screw zones 1 to 7 of the extruder being 160° C., 180° C., 180° C., 180° C., 180° C., 175° C., 175° C. respectively, die head temperature being 160° C., molten mass pressure being 15 MPa, and host rotation rate being 50 rpm;

(3) The plasticized polypropylene molten mass was passed through the special flat extrusion die for molding, to form the polypropylene extrusion board at fusion state bearing pore space in the core, where the special flat extrusion die was one having one or more rows of core rods in the center, and the core rods were used to provide the pore canal structure in the center of the polypropylene extrusion board, and had the cross section in the shape of circle, and the pore canals had the height of 1 mm, the width of 10 mm and the pitch of 5 mm between the pore canals;

(4) The polypropylene extrusion board at fusion state having pore space in the core was passed through the cooling and shaping table by pulling force from the hauler, to provide preliminary cooling and shaping, with the a pulling rate of the hauler being 50 cm/min, the a temperature of the cooling and shaping table being 20° C., and the vacuum level being 0.01 MPa;

(5) After exiting the cooling and shaping table, the preliminarily shaped polypropylene extrusion board was passed into the spraying tank for further cooling at the temperature of spray water of 10° C.; and (6) The sprayed polypropylene extrusion board was cut at a certain length by the cutter, to obtain the polypropylene motherboard.

Embodiment 10

A method for producing the polypropylene motherboard bearing the core structure by an extrusion molding production line including a blender, a crew extruder, a special flat extrusion die, a cooling and shaping table, a spraying tank, a hauler and a cutter. The specific preparation process was as follows:

(1) The randomly copolymerized polypropylene with melt index of 3.0 g/10 min was drawn into the hopper of the crew extruder and dried at 80° C. for 2 hours;

(2) The dried raw material was plasticized and mixed in the crew extruder with the parameters set as: processing temperature at the screw zones 1 to 7 of the extruder being 160° C., 180° C., 180° C., 180° C., 180° C., 175° C., 175° C. respectively, die head temperature being 160° C., molten mass pressure being 15 MPa, and host rotation rate being 50 rpm;

(3) The plasticized polypropylene molten mass was passed through the special flat extrusion die for molding, to form the polypropylene extrusion board at fusion state bearing pore space in the core, where the special flat extrusion die was one having one or more rows of core rods in the center, and the core rods were used to provide the pore canal structure in the center of the polypropylene extrusion board, and had the cross section in the shape of circle, and the pore canals had the height of 1 mm, the width of 10 mm and the pitch of 5 mm between the pore canals;

(4) The polypropylene extrusion board at fusion state having pore space in the core was passed through the cooling and shaping table by pulling force from the hauler, to provide preliminary cooling and shaping, with the pulling rate of the hauler being 50 cm/min, the a temperature of the cooling and shaping table being 20° C., and the vacuum level being 0.01 MPa;

(5) After exiting the cooling and shaping table, the preliminarily shaped polypropylene extrusion board was passed into the spraying tank for further cooling at the temperature of spray water of 10° C.; and (6) The sprayed polypropylene extrusion board was cut at a certain length by the cutter, to obtain the polypropylene motherboard.

What is claimed is:

1. A method for producing a microcellular foam polypropylene thick board by foaming a polypropylene motherboard with a special supercritical flat foaming equipment, wherein the polypropylene motherboard bears a core structure, the polypropylene motherboard bearing the core structure is the polypropylene extruded board having one or more rows of pore canals in a center, the polypropylene extruded board has a thickness of 5-50 mm, the pore canals have a cross-section in a shape of a polygon with a number of sides of 3-8, a circle or an ellipse, the pore canals have a height of 0.1-10 mm, a width of 0.1-50 mm, and a pitch of 0:1-20 mm between the pore canals;

wherein the supercritical flat foaming equipment comprises: a hydraulic system for supply clamping pressure, a temperature control system for supplying heat, a pressure gas delivery system for supplying supercritical fluid, a flat foaming mold, a flash blow-down system and a gas recovery system; and wherein the foaming process comprises the following steps:

(1) the flat foaming mold is heated up to a foaming temperature by the temperature control system for supplying heat;

(2) the polypropylene motherboard bearing the core structure is placed into the flat foaming mold, which is driven by the hydraulic system for closing; upon pressurizing up to 15-20 MPa by the hydraulic system, a high pressure and high temperature gas is introduced into the flat foaming mold by the pressure gas delivery system until the gas pressure is up to 5-25 MPa;

(3) the high pressure and high temperature gas is diffused from the surface and core of the polypropylene motherboard into a polymeric matrix, with a saturation time required for diffusion being 30-200 minutes; and (4) upon dissolution in equilibrium, the high pressure and high temperature gas within the flat foaming mold is blown down by the flash blow-down system and is recovered by the gas recovery system; when the mold is opened, the polypropylene motherboard pops out of the mold and foams to give the microcellular foam polypropylene material.

2. The method for producing the microcellular foam polypropylene thick board according to claim 1, wherein the foaming temperature mentioned in Step (1) is lower than a melting point of polypropylene; the high pressure and high temperature gas mentioned in Step (2) is carbon dioxide or nitrogen gas, or a mixture of both at an arbitrary ratio.

3. The method for producing the microcellular foam polypropylene thick board according to claim 1, wherein the flat foaming mold has a sealing material, and the sealing material is a composite of any one or more of beryllium copper, aluminum, graphite or polytetrafluoroethylene.

4. A method for producing the polypropylene motherboard bearing the core structure according to claim 1, by an extrusion molding production line comprising a blender, a screw extruder, a special flat extrusion die, a cooling and shaping table, a spraying tank, a hauler and a cutter; and a specific preparation process is as follows:

(1) a raw material polypropylene is drawn into a hopper of the screw extruder and dried at 70-80° C.;

(2) the dried raw material is plasticized and mixed in the screw extruder with parameters set as: a screw temperature of 160-250° C., a die head temperature of 160-180° C., a molten mass pressure of 5-15 MPa, and a host rotation rate of 10-50 rpm;

(3) the plasticized polypropylene molten mass is molded by the special flat extrusion die, to form the polypropylene extrusion board at fusion state having pore space in the core;

(4) the polypropylene extrusion board at fusion state having pore space in the core is passed through the cooling and shaping table by puffing force from the hauler, to provide preliminary cooling and shaping, with a puffing rate of the hauler being 10-50 cm/min, and a temperature of the cooling and shaping table being 5-20° C.;

(5) after exiting the cooling and shaping table, the preliminarily shaped polypropylene extrusion board is passed into the spraying tank for further cooling at a temperature of spray water of 10-30° C.; and (6) the sprayed polypropylene extrusion board is cut at a certain length by the cutter, to obtain the polypropylene motherboard.

5. The method for producing the polypropylene motherboard bearing the core structure according to claim 4, wherein the special flat extrusion die mentioned in Step (3) is one having one or more rows of core rods in the center.

6. The method for producing the polypropylene motherboard bearing the core structure according to claim 5, wherein the core rods have a cross section in the shape of polygon having side number of 3-8, circle or ellipse; the core rods have a height of 0.1-10 mm; the core rods have a width of 0.1-50 mm; and a pitch between the core rods is 0.1-20 mm.

7. The method for producing the polypropylene motherboard bearing the core structure according to claim 4, wherein the raw material polypropylene mentioned in Step (1) is polypropylene of general grade, with melt index of 0.1-5.0 g/10 min.

8. The method for producing the polypropylene motherboard bearing the core structure according to claim 4, wherein to the raw material polypropylene mentioned in Step (1), an aid is added and premixed in the blender, and then drawn into the hopper of the screw extruder and dried at 70-80° C.; the aids comprise a color masterbatch, an inorganic filler, a fire retardant, an anti-static agent; and on a basis of 100 parts by weight of the raw material polypropylene, the color masterbatch is 0-2 parts by weight, the inorganic filler is 0-10 parts by weight, the fire retardant is 0-30 parts by weight, and the anti-static agent is 0-15 parts by weight.

* * * * *